United States Patent [19]

Mennicke

[11] Patent Number: 4,497,734
[45] Date of Patent: Feb. 5, 1985

[54] ASYMMETRICAL 1:2 CHROMIUM COMPLEXES DERIVED FROM AZO AND AZOMETHINE DYES

[75] Inventor: Winfried Mennicke, Leverkusen, Fed. Rep. of Germany

[73] Assignee: Bayer Aktiengesellschaft, Leverkusen, Fed. Rep. of Germany

[21] Appl. No.: 404,805

[22] Filed: Aug. 3, 1982

[30] Foreign Application Priority Data

Aug. 25, 1981 [DE] Fed. Rep. of Germany ....... 3133505

[51] Int. Cl.³ ...................... C09B 45/06; C09B 45/16; D06P 1/10; D06P 3/32
[52] U.S. Cl. .................... 534/695; 564/272; 564/273; 564/274; 564/85; 534/703; 534/738; 534/778; 534/780; 534/787
[58] Field of Search ........................ 260/145 B, 146 R

[56] References Cited

U.S. PATENT DOCUMENTS

| | | | |
|---|---|---|---|
| 2,734,052 | 2/1956 | Dittmar et al. | 260/146 R |
| 2,753,344 | 7/1956 | Schmidt et al. | 260/240 |
| 2,807,627 | 9/1957 | Putter et al. | 260/327 |
| 2,985,646 | 5/1961 | Schetty et al. | 260/145 |
| 4,052,374 | 10/1977 | Baumann | 260/145 |

*Primary Examiner*—Floyd D. Higel
*Attorney, Agent, or Firm*—Sprung, Horn, Kramer & Woods

[57] ABSTRACT

Asymmetrical 1:2 chromium complex dyestuffs which, in the form of the free acid, correspond to the formula

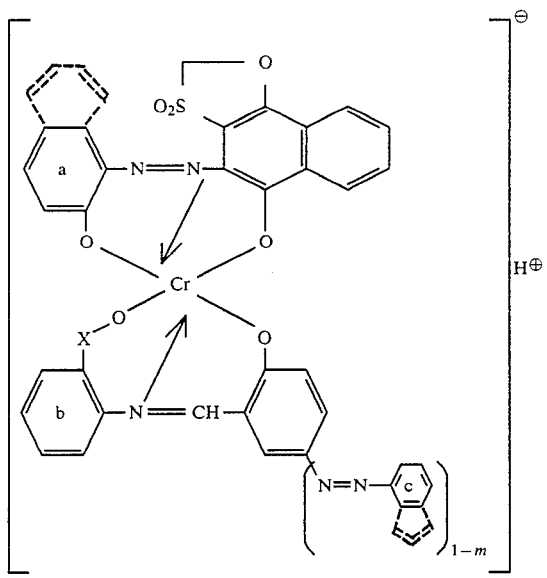

wherein
X represents CO or a direct bond and
m represents 0 or 1 and
the rings a, b and c and, if present, fused-on benzene rings can carry further substituents customary in the chemistry of metal complex dyestuffs,
are used for dyeing materials containing amide groups, in particular leather, and produce dyeings having a green hue and good general fastness properties.

6 Claims, No Drawings

ASYMMETRICAL 1:2 CHROMIUM COMPLEXES DERIVED FROM AZO AND AZOMETHINE DYES

The present invention relates to 1:2 chromium complex dyestuffs which, in the form of the free acid, correspond to the formula

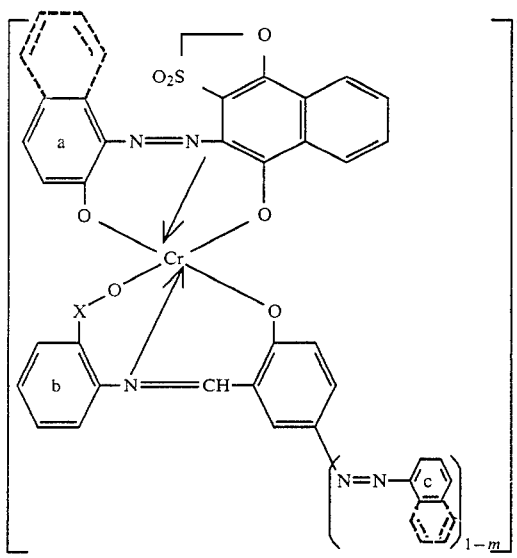

wherein

X represents CO or a direct bond and m represents 0 or 1 and the rings a, b and c and, if present, fused-on benzene rings can carry further substituents customary in the chemistry of metal complex dyestuffs.

Examples of suitable substituents on the rings a, b and c are $SO_3H$, sulphamoyl, carbamoyl, alkyl, trifluoromethyl, alkoxy, alkylsulphonyl, $NH_2$, $NO_2$, Cl and Br.

Preferable alkyl and alkoxy groups are those which have 1-4 C atoms and which can optionally be further substituted by, for example, CN, Cl, OH, $C_1$-$C_4$-alkoxy or phenyl. Methyl and methoxy are particularly preferable.

Preferable acylamino groups are, in particular, $C_1$-$C_4$-alkylcarbonylamino, $C_1$-$C_4$-alkoxycarbonylamino and $C_1$-$C_4$-alkylsulphonylamino.

The sulphamoyl and carbamoyl groups can be monosubstituted or disubstituted, for example by optionally substituted $C_1$-$C_4$-alkyl or by aryl, in particular optionally substituted phenyl.

Preferable aryl radicals are, in particular optionally substituted phenyl radicals having substituents such as halogen, in particular Cl and Br, $NO_2$, $C_1$-$C_4$-alkoxy or $C_1$-$C_4$-alkyl.

Preferable dyestuffs are those of the formulae

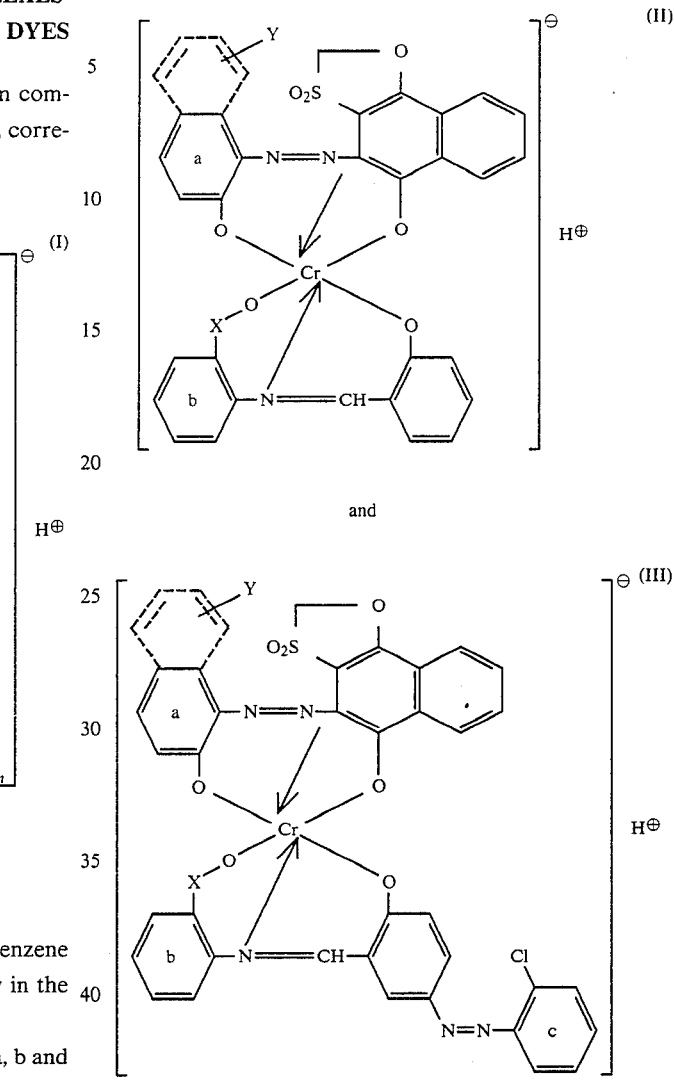

and wherein ring a can be substituted by $SO_3H$, sulphamoyl, Cl or $NO_2$, ring b can be substituted by $SO_3H$, sulphamoyl, Cl, $NO_2$ or $CH_3$ and ring c can be substituted by $SO_3H$, sulphamoyl, Cl, $CH_3$ or $OCH_3$ and X has the abovementioned meaning and Y represents H or $NO_2$.

Preferable dyestuffs (II) and (III) are those which have a single sulpho group in the molecule.

The dyestuffs according to the invention are obtained in a manner which is in itself known (compare, for example, German Patent Application No. 2,735,287, U.S. Pat. No. 2,985,646 and British Patent Application No. 1,197,265), by converting a dyestuff of the formula

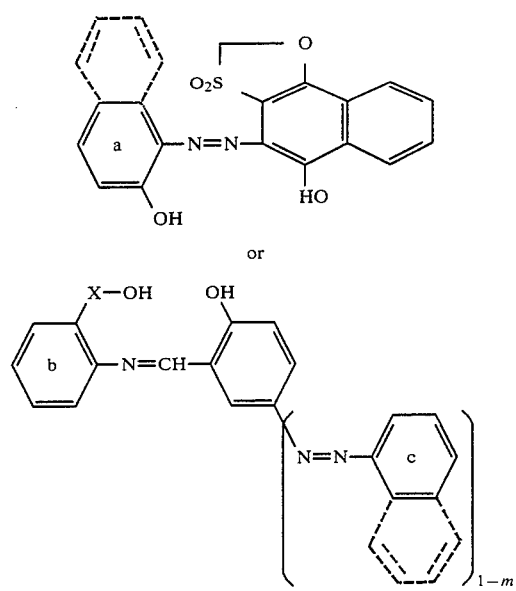

(IV)

or (V)

with a chromium-donating agent into the 1:1 chromium complex and reacting the latter with the corresponding nonmetallised dyestuff of the formula (V) or (IV) respectively.

Because of their ready accessibility, mixtures of amines of the formula

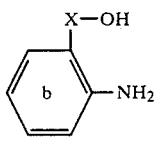

(VI)

with the aldehydes of the formula

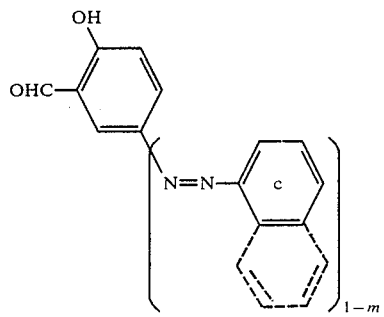

(VII)

can also be used instead of the azomethines of the formula (V).

The monoazo dyestuffs of the formula (IV) are obtained in a known way, by coupling diazotised amines of the formula

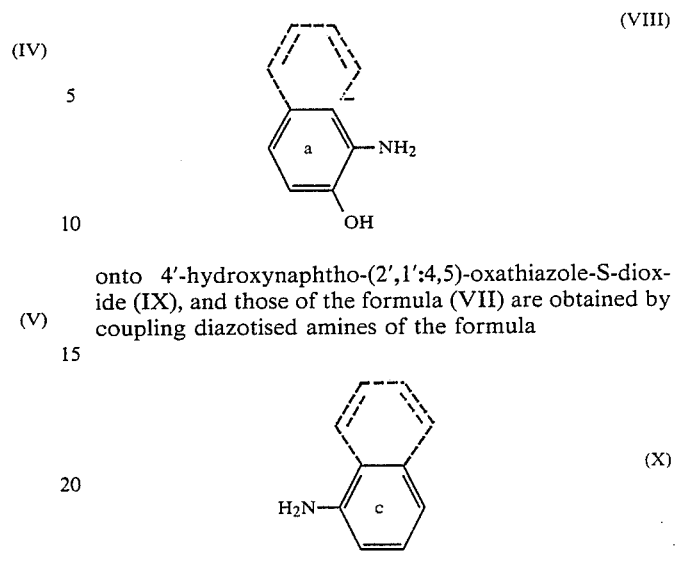

onto 4'-hydroxynaphtho-(2',1':4,5)-oxathiazole-S-dioxide (IX), and those of the formula (VII) are obtained by coupling diazotised amines of the formula onto salicylaldehyde.

The compound (IX) and the monoazo dyestuffs prepared therefrom are known (compare German Patent Applications Nos. 913,177, 940,483 and 1,011,574).

Examples of suitable diazo compounds of the formula (VIII) are: 2-amino-1-hydroxybenzene, 4- or 5-chloro-2-amino-1-hydroxybenzene, 4,6-dichloro-2-amino-1-hydroxybenzene, 4- or 5-nitro-2-amino-1-hydroxybenzene, 4,6-dinitro-2-amino-1-hydroxybenzene, 4-chloro and 4-methyl- and 4-acetylamino-6-nitro-2-amino-1-hydroxybenzene, 6-methyl-, 6-acetylamino- and 6-chloro-4-nitro-2-amino-1-hydroxybenzene, 4-chloro-6-acetamino-2-amino-1-hydroxybenzene, 4-chloro-5-nitro-2-amino-1-hydroxybenzene, 4- or 5-methyl-2-amino-1-hydroxybenzene, 2-methoxy-2-amino-1-hydroxybenzene, 2-amino-1-hydroxybenzene-4- or -5-methyl sulphone, 2-amino-1-hydroxybenzene-4- or -5-phenyl sulphone, 2-amino-1-hydroxybenzene-4-ethyl, -4-chloromethyl and -4-butyl sulphones, 2-amino-1-hydroxybenzene-4- or -5-sulphonamide, 2-amino-1-hydroxybenzene-4- or -5-sulphomethylamide, 2-amino-1-hydroxybenzene-4- or -5-sulphodimethylamide, 2-amino-1-hydroxybenzene-4- -5-sulphanilide, 4-nitro-2-amino-1-hydroxybenzene-5- or -6-sulphonamide, 2-amino-1-hydroxybenzene-4-sulphanthranilide, 2-amino-1-hydroxybenzene-4- or -5-sulphonic acid, 4-nitro-2-amino-1-hydroxybenzene-5- or -6-sulphonic acid, 5-nitro- or 6-nitro-2-amino-1-hydroxybenzene-4-sulphonic acid, 6-chloro-2-amino-1-hydroxybenzene-4-sulphonic acid, 4-chloro-2-amino-1-hydroxybenzene-6-sulphonic acid, 4-methyl-2-amino-1-hydroxybenzene-5- or -6-sulphonic acid, 2-amino-1-hydroxynaphthalene-4-sulphonic acid, 1-amino-2-hydroxynaphthalene-4-sulphonic acid and 6-nitro-, 6-methyl- or 6-bromo-1-amino-2-hydroxynaphthalene-4-sulphonic acid.

Examples of amines of the formula (VI) are all amines of the formula (VIII) derived from benzene and also 2-aminobenzoic acid, 2-amino-4- or -5-sulphonbenzoic acid, 2-amino-4- or -5-sulphonamidobenzoic acid, 4-, 5- or 6-chloro-2-aminobenzoic acid, 3,5-dichloro-2-aminobenzoic acid and 4- or 5-nitro-2-aminiobenzoic acid.

Possible examples of amines (X) are: 2-, 3- or 4chloroaniline, 2,4-, 2,5- or 3,5-dichloroaniline, 2-, 3- or 4-methylaniline, 2,4- or 2,5-dimethylaniline, 2-chloro-5-methylaniline, 2,4-dichloro-5-methylaniline, aniline-2-, -3- or -4-sulphonic acid, aniline-3- or -4-sulphonamide, 2-methoxyaniline-5-sulphonamide, 2-chloro-4-cyanoaniline, aniline-2-, -3- or -4-carboxylic acid, aniline-3- or -4-carboxyamide, 2-chloroaniline-5-carboxamide, -5-sulphonamide or -5-methyl sulphone, 2-chloroaniline-4-sulphonic acid, 2,5-dichloroaniline-4-sulphonic acid, 2-methyl- or 2-methoxyaniline-5-sulphonic acid, 4-methoxyaniline-2-sulphonic acid, 2-methylaniline-4-sulphonic acid, 2- 3- or 4-methoxyaniline, 2-methoxy-5-methylaniline, 1-naphthylamine, 1-naphthylamine-4-, -5-, -6- or -7-sulphonic acid and 2-naphthylamine-1-, -5-, -6-, -7- or -8-sulphonic acid.

The conversion of azo dyestuffs of the formula (IV) or azomethine dyestuffs of the formula (V) into the 1:1 chromium complex is effected by customary methods which are in themselves known, by, for example, reacting the metal-free dyestuff with a salt of 3-valent chromium, such as chromium chloride, chromium fluoride, chromium sulphate or chromium formate, in an aqueous medium at the boiling point of, if necessary, at a higher temperature. The metallisation can also be carried out in the presence of organic solvents or in organic solvents alone, for example in alcohols, ether-alcohols or ketones. The reaction proceeds particularly smoothly when water is excluded, by, for example according to the process of German Offenlegungsschrift No. 2,605,574, distillatively removing the water of reaction during the chromation in ether-alcohols.

The reaction of the 1:1 chromium complexes of the dyestuffs of the formula (IV) or (V) with the metal-free dyestuffs of the formula (V) or (IV) respectively or the reaction of the 1:1 chromium complexes derived from the azo dyestuffs of the formula (IV) with mixtures of the amines of the formula (VI) and the aldehydes of the formula (VII) is advantageously carried out in an alkaline to weakly acid medium at a normal or elevated temperature, preferably within the range of 50°–100° C. This reaction can also be carried out in an aqueous solution in the presence of a solvent or in a solvent alone, lower alcohols, such as ethanol, ketones, such as ethyl methyl ketone, glycols, ether-alcohols, such as ethylglycol or butylglycol, and carboxamides, such as formamide or dimethylformamide, coming into consideration. The reactants are preferably used in stoichiometric amounts; an excess of metal-containing dyestuff generally has a less disadvantageous effect than an excess of metal-free dyestuff.

The acid liberated on adding the metal-free to the metal-containing dyestuff is scavenged by adding agents which have an alkaline action, for example by adding hydroxides or carbonates of alkali metals, such as the hydroxide or carbonate of lithium, sodium or potassium, by adding ammonia or organic amines, such as mono-, di- or triethylamine or mono-, di- or triethanolamine, or tetraalkylammonium hydroxides, such as tetramethylammonium hydroxide. The agents which have an alkaline action are preferably added at such a rate that the reaction proceeds at a constant pH value.

At the end of the reaction, the 1:2 chromium complex dyestuffs according to the invention are present as a salt of the complex acid and of the $SO_3H$ groups bonded to it with the abovementioned agents having an alkaline action, for example as alkali metal salts when using alkali metal hydroxides or alkali metal carbonates or as ammonium salts when using ammonia, amines or tetralkylammonium hydroxides. For the neutralisation, it is also possible to use amines which form, with the 1:2 chromium complex dyestuffs, salts which are sparingly soluble in water, so that the salts can only be dissolved on adding organic solvents or in these solvents alone. Examples of amines of this type are N-ethyl-N-hexylamine, dodecylamine, oleylamine, cyclohexylamine, N,N-dicyclohexylamine, N,N'-diphenylguanidine and N,N'-ditolylguanidine.

The 1:2 chromium complexes thus prepared, which, in the acid form, correspond to the dyestuffs of the formula (I), can be isolated by salting out with alkali metal salts, drum-evaporation or spray drying and processed, using customary auxiliary and standardising agents, into water-soluble formulations, be they powders, granules having a particle size of at least $20\mu$ or formulations which are cold-dispersible or soluble in cold water.

The preparation of liquid formulations by using organic solvents, if appropriate in mixture with water and if appropriate with added solubilisers, such as, for example, urea, is also possible and even advisable because it is possible to carry out the synthesis of the 1:2 chromium complexes or a part of this synthesis and the preparation of the dyestuff solutions in one vessel without intermediate isolations. Particularly advantageous is the process of German Offenlegungsschrift No. 2,443,483 in which, inter alia, the metal-free dyestuff is added to the metal-containing dyestuff in solvents which have hydroxyl groups in the presence of lithium salts having an alkali action and at the same time concentrated dyestuff solutions having a long shelf life are obtained. Liquid dyestuff formulations are also possible by liquid-liquid extractions, by, as described, for example, in European Patent Publication No. 24,609, carrying out a phase separation in a solution of water and an ether-alcohol by adding inorganic salts and separating off the phase containing the organic dyestuff.

The 1:2 chromium complexes of the formula (I) which, due to the cations contained therein, are sparingly soluble in water and readily soluble in organic solvents can be used for colouring organic liquids, resins or lacquers, for wood stains or ballpoint pen inks.

The 1:2 chromium complexes of the formula (I) which due to the cations contained therein, are readily soluble in water are suitable for dyeing and printing a wide variety of materials, above all for dyeing natural or synthetic materials which contain amide groups, such as wool, silk, leather and polyamide or polyurethane fibre. They are suitable above all for dyeing from a bath which is weakly alkaline, neutral or weakly acid, for example contains acetic acid. Level dyeings are obtained which have olive-coloured to brilliant green hues and good light and end-use fastness properties.

Liquid formulations of the dyestuffs according to the invention which have one sulphor group are suitable also for spray dyeing leather and for dyeing leather on continuous multipurpose machines, for example of the MULTIMA type, a process in which particularly the dyestuffs having an arylazo group on salicylaldehyde (formula I, m=0) are distinguished by good bonding to the substrate and good fastness to water spotting.

EXAMPLE 1

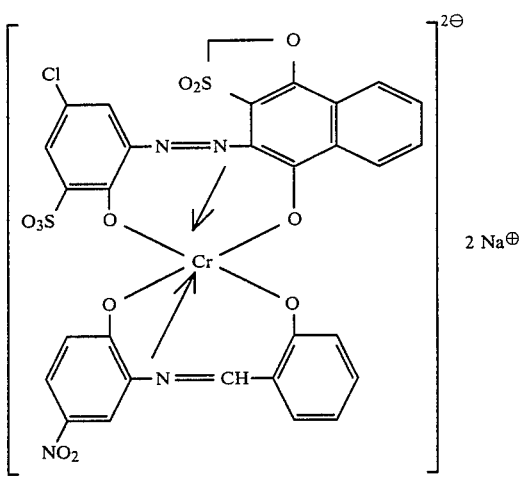

47.1 g of the monoazo dyestuff formed from diazotised 4-chloro-2-amino-1-hydroxybenzene-6-sulphonic acid and 4'-hydroxynaphtho-(2',1':4,5)-oxathiazole-S-dioxide are heated for 5 hours under reflux in 500 ml of ethylene glycol monoethyl ether together with 26.65 g of $CrCl_3.6H_2O$. The solution of the resulting 1:1 chromium complex is allowed to cool down to 80° C., and 15.4 g of 4-nitro-2-amino-1-hydroxybenzene, 12.2 g of salicylaldehyde and, dropwise, about 60 ml of a 40% strength sodium hydroxide solution are added. During this addition the temperature is continued to be maintained at 80° C. and the sodium hydroxide solution is added dropwise at such a rate that the pH varies within the range of 7-8. Half an hour later, when sodium hydroxide solution is no longer consumed, the starting compounds have formed the mixed chromium complex. It is possible, with saturated sodium chloride solution, to precipitate from the deep green solution a precipitate which, in the dried state, is a dark green powder. It dyes wool and polyamide in green shades having good fastness properties.

EXAMPLE 2

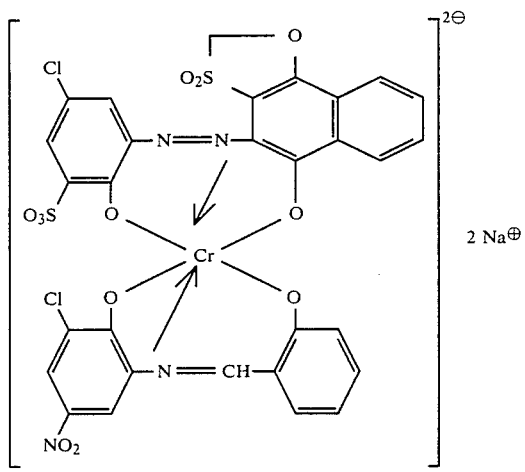

18.95 g of 4-nitro-6-chloro-2-amino-1-hydroxybenzene are dissolved in 500 ml of water together with 12 ml of a 40% strength sodium hydroxide solution by heating to 70° C. The 1:1 chromium complex, prepared from 47:1 g of the monoazo dyestuff formed from diazotised 4-chloro-2-amino-1-hydroxybenzene-6-sulphonic acid and 4'-hydroxynaphtho-(2',1':4,5)-oxathiazole-S-dioxide, is added, and, at 70°-80° C., about 50 ml of a 40% strength sodium hydroxide solution and 12.2 g of salicylaldehyde are added dropwise at such a rate that the pH value is maintained within the range of 7-8. After about 30 minutes, the addition to the 1:1 chromium complex is complete. The solution is converted by spray drying into a dark green powder which, on wool and polyamide, produces brilliant green dyeings having good light and wet fastness properties.

The mixed chromium complexes which are indicated in the examples below and which, in the dried state, are dark green to black powders can be prepared in the same way.

EXAMPLE 3

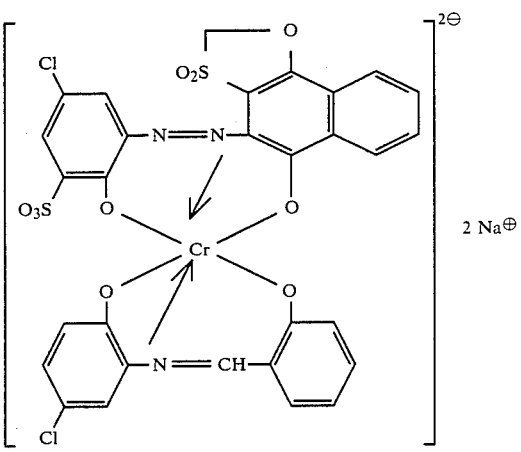

dyes wool, polyamide and leather in fast green shades. Hue is bluer than Example 2.

EXAMPLE 4

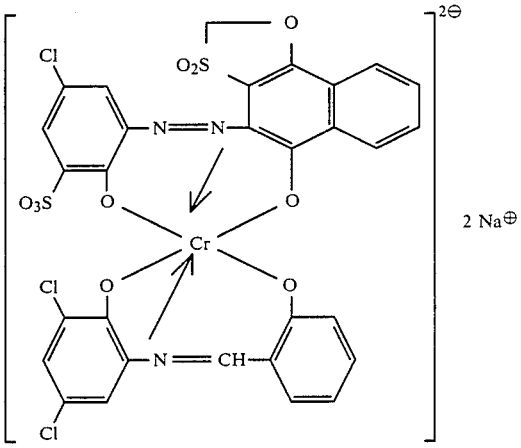

green dyeings on wool, polyamide and leather, having good fastness properties. Bluer hues than Example 2.

EXAMPLE 5

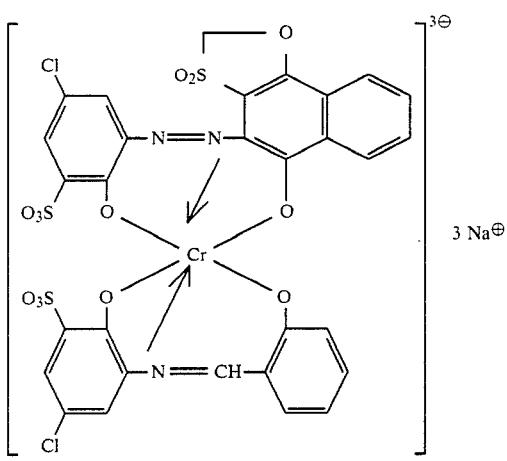

brillant green dyes on wool, polyamide and leather.

EXAMPLE 6

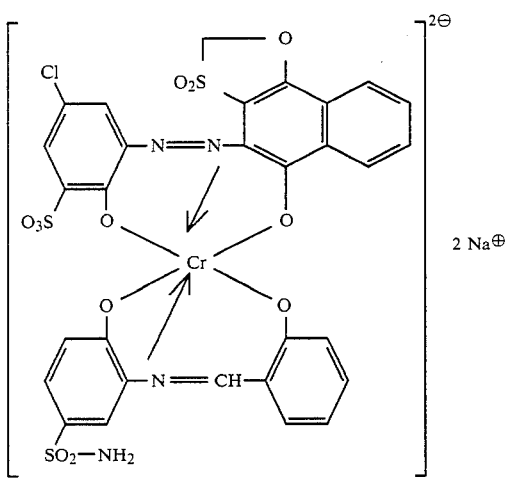

gives green dyeings on wool and polyamide, somewhat bluer than Example 2.

EXAMPLE 7

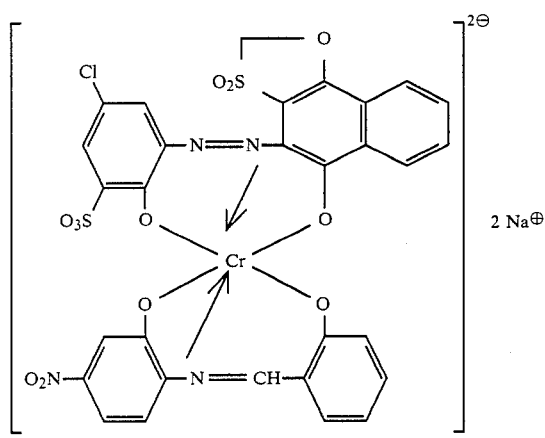

green dyeings on wool, polyamide and leather, somewhat yellower than Example 2.

EXAMPLE 8

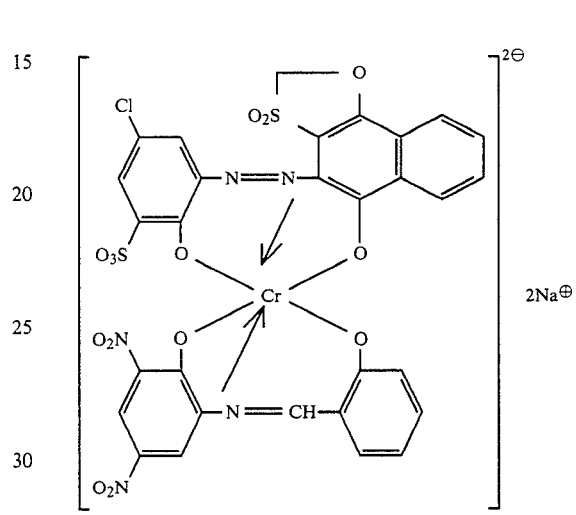

olive-green dyeings on wool, polyamide and leather, having good fastness properties.

EXAMPLE 9

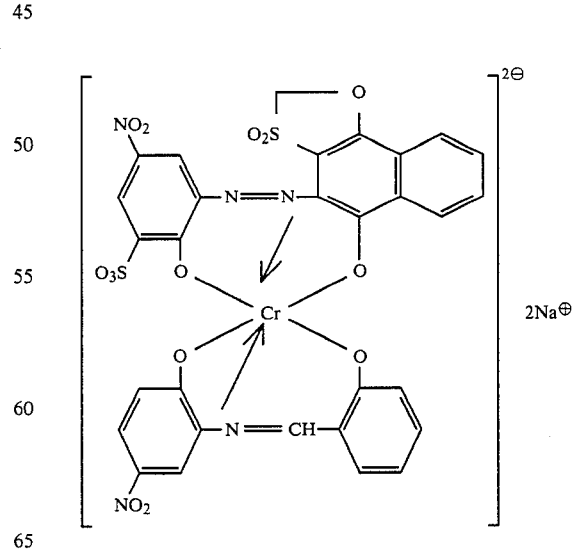

olive-green dyeings on wool, polyamide and leather.

EXAMPLE 10

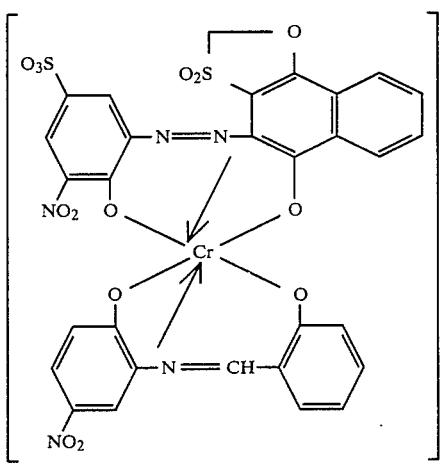

green dyeings on wool, polyamide and leather, with good light and wet fastness properties.

EXAMPLE 11

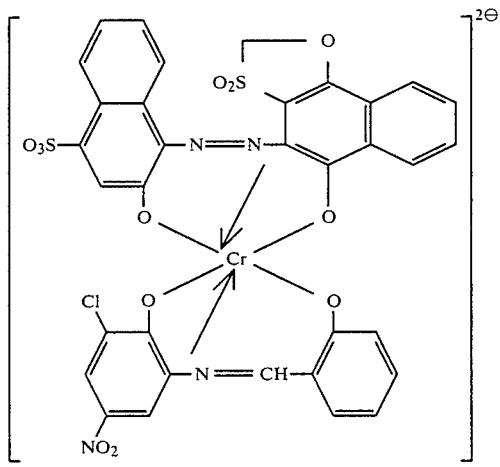

brillant green dyeings on wool, polyamide and leather.

EXAMPLE 12

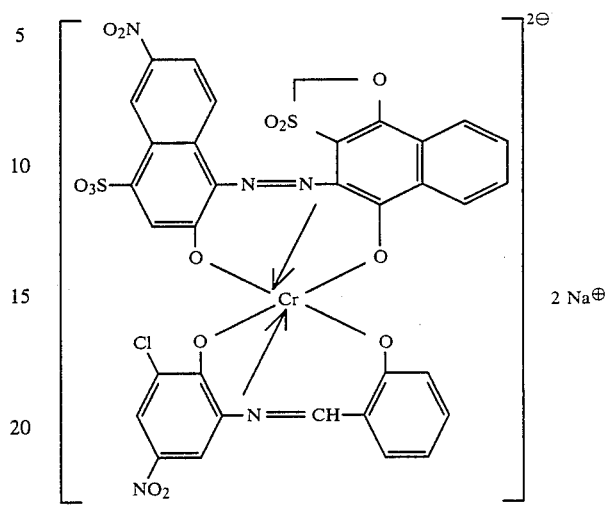

black-green dyeings with good light and wet fastness properties on wool, polyamide and leather.

EXAMPLE 13

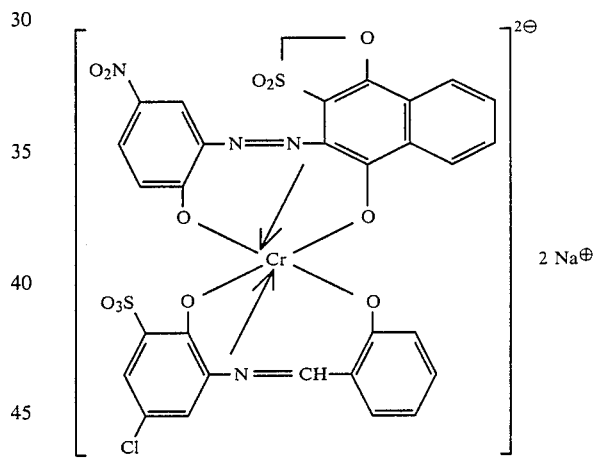

40.1 g of the monoazo dyestuff formed from diazotised 4-nitro-2-amino-1-hydroxybenzene and 4'-hydroxynaphtho-(2',1':4,5)-oxathiazole-S-dioxide are heated to 80° C. in 500 ml of water in the presence of 20 ml of a 40% strength sodium hydroxide solution. The 1:1 chromium complex obtained from 22.4 g of 4-chloro-2-amino-1-hydroxybenzene-6-sulphonic acid, 12.2 g of salicylaldehyde and 26.65 g of $CrCl_3.6H_2O$ is added in portions to this solution. The pH is maintained at 7–8 by the simultaneous dropwise addition of about 40 ml of a 40% strength sodium hydroxide solution. Half an hour later, the addition of the monoazo dyestuff to the 1:1 chromium complex is complete. Drum-drying produces a dark green powder which dyes wool and polyamide in olive-tinged green fast shades.

The mixed chromium complexes indicated in the three examples which follow can be prepared in the same way.

EXAMPLE 14

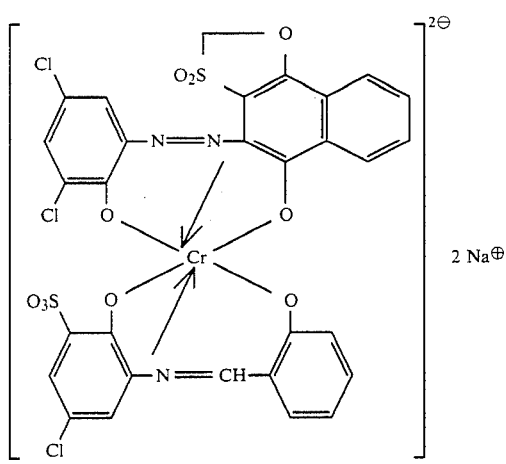

dark green powder which produces clear green dyeings on wool, polyamide and leather.

EXAMPLE 15

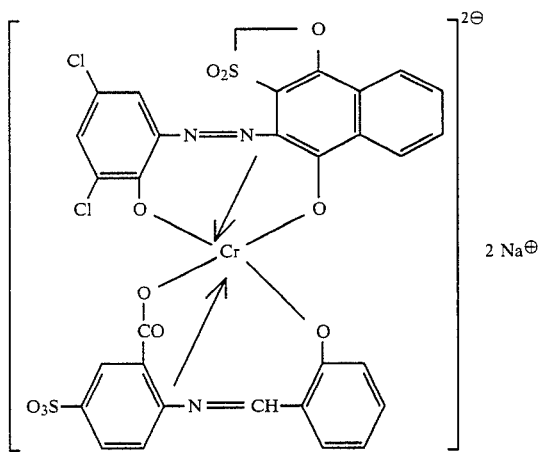

clear, green dyeings on wool and polyamide.

EXAMPLE 16

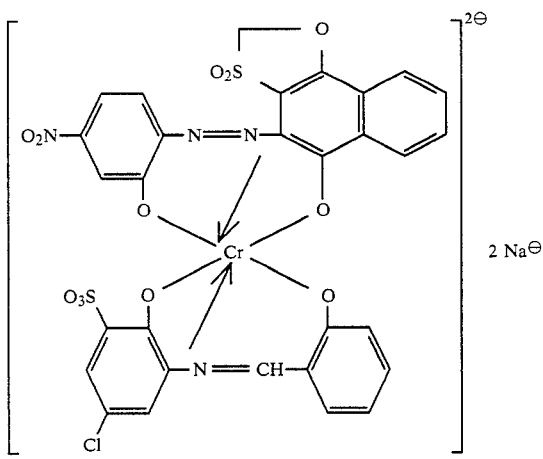

blue-tinged green dyeings on wool, polyamide and leather with good light and wet fastness properties.

EXAMPLE 17

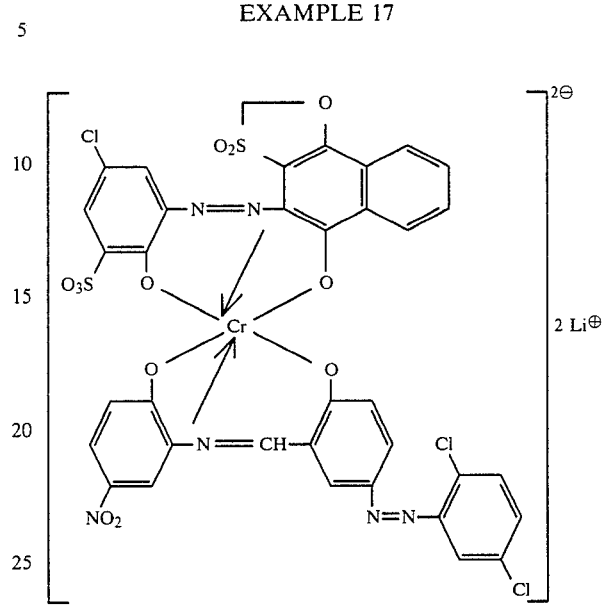

The 1:1 chromium complex obtained from 22.35 g of diazotised 4-chloro-2-amino-1-hydroxybenzene-6-sulphonic acid, 23.6 g of 4'-hydroxynaphtho-(2',1':4,5)-oxathiazole-S-dioxide and 26.65 g of $CrCl_3.6H_2O$ is stirred, as a moist paste, into 400 ml of ethylene glycol monoethyl ether. 15.4 g of 4-nitro-2-amino-1-hydroxybenzene and a moist paste of 29.5 g of the coupling product of diazotised 2,5-dichloroaniline and salicylaldehyde are added. The mixture is heated at 80° C. and, during this, maintained at pH 7–8 by the occasional addition of a total of about 21 g of solid $LiOH.H_2O$. After half an hour, the asymmetrical 1:2 chromium complex is finished. The solution is allowed to cool down to room temperature, small salt residues are separated off by filtration, and a concentrated deep green solution which has a long shelf life is obtained. This solution produces, on a MULTIMA dyeing machine, clear yellow-tinged green leather dyeings having good dyestuff bonding, good fastness to water spotting and good light fastness.

The replacement of 2,5-dichloroaniline by other aniline derivatives or aniline or the replacement of 4-chloro-2-amino-1-hydroxybenzene-6-sulphonic acid or 4-nitro-2-amino-1-hydroxybenzene by other amines produces the mixed chromium complexes listed under Examples 18, 19 and 20. They are shown as sodium salts, in which form they are generally present in solid formulations. However, they can also be preferably stored in the form of their lithium salts as solutions and be used for dyeing. They produce, on wool, polyamide and leather, yellow-tinged green to olive-green dyeings having good end-use fastness properties.

EXAMPLE 18
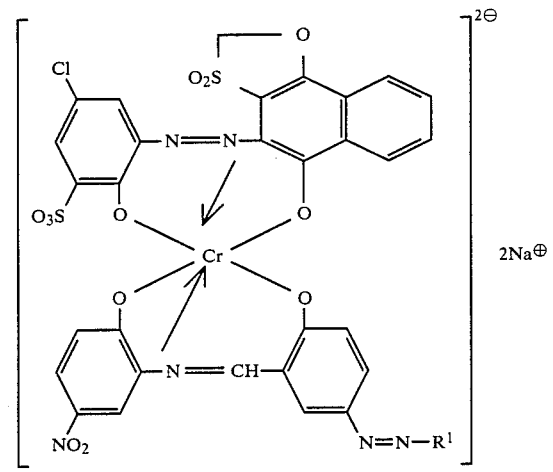
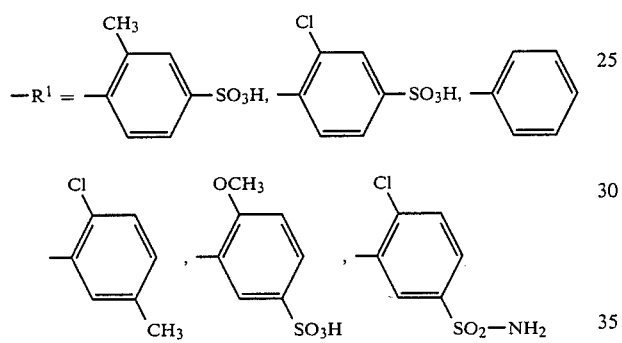
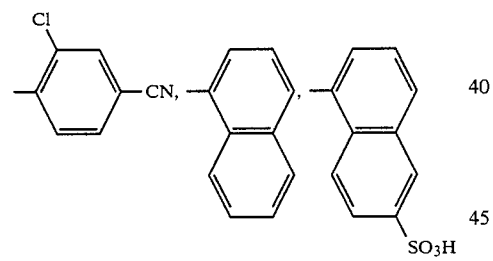
EXAMPLE 19
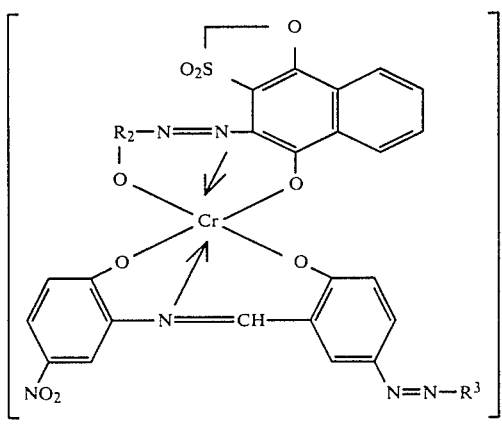
-continued
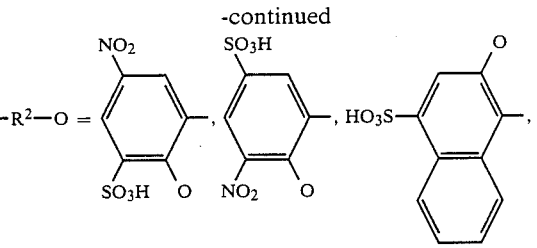
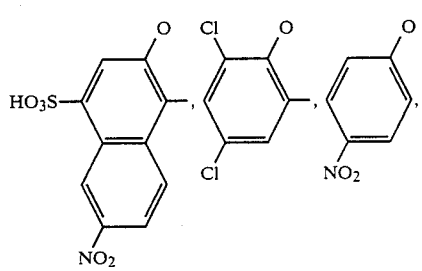
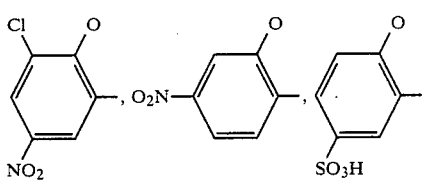
—R³ = —R¹ of Example 18 and 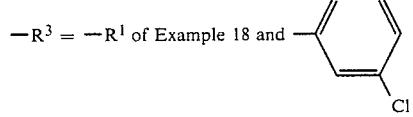
EXAMPLE 20
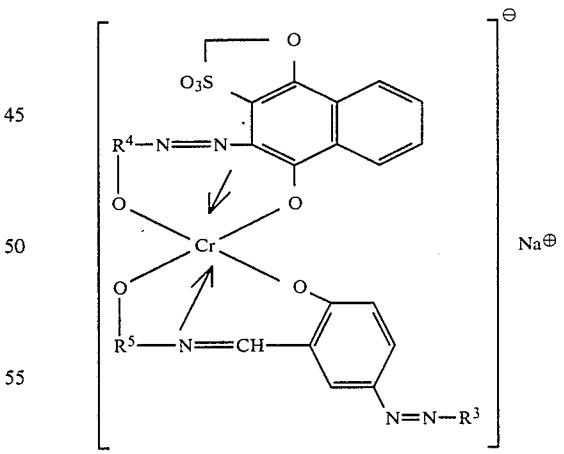
—R³ = —R³ of Example 19
—R⁴—O = —R²—O of Example 19 + 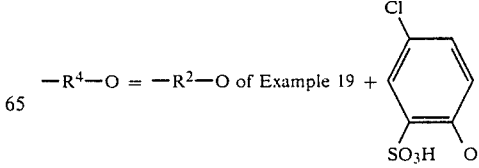

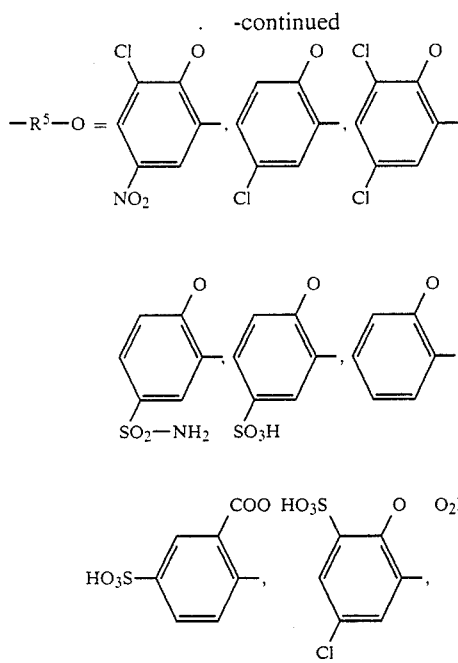

I claim:
1. A dyestuff of the formula

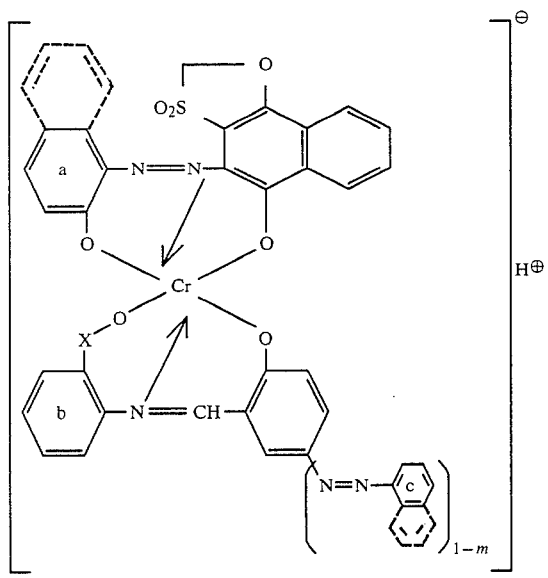

in the free-acid form,
wherein
x = CO or direct bond,
m = 0 or 1,
Y = H or NO₂
ring a is unsubstituted or substituted by SO₃H, sulfamoyl, Cl or NO₂ ring b is unsubstituted or substituted by SO₃H, sulfamoyl, Cl, NO₂ or CH₃ ring c is unsubstituted or substituted by SO₃H, sulfamoyl, Cl, CH₃ or OCH₃.

2. Dyestuff of claim 1 which contains a single sulfo group.

3. A dyestuff of claim 1 of the formula

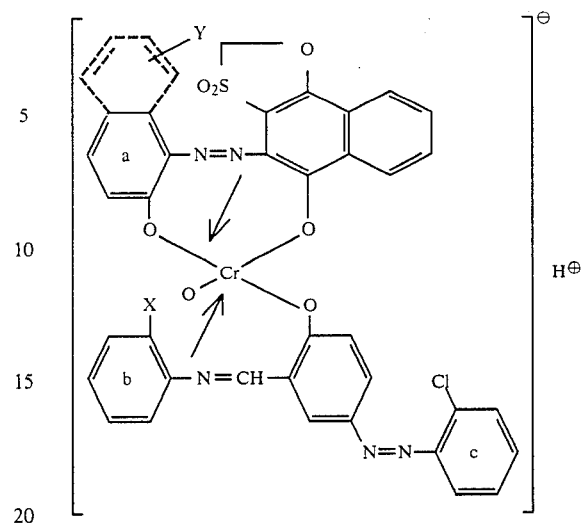

wherein
ring a is unsubstituted or substituted by SO₃H, sulphamoyl, Cl, or NO₂,
ring b is unsubstituted or substituted by SO₃H, sulphamoyl, Cl, NO₂ or CH₃ and
ring c is unsubstituted or substituted by SO₃H, sulphamoyl, Cl, CH₃ or OCH₃ and
X represents CO or a direct bond and
Y represents H or NO₂

4. A dyestuff of claim 3 which contain a single sulpho group.

5. A dyestuff according to claim 1 of the formula

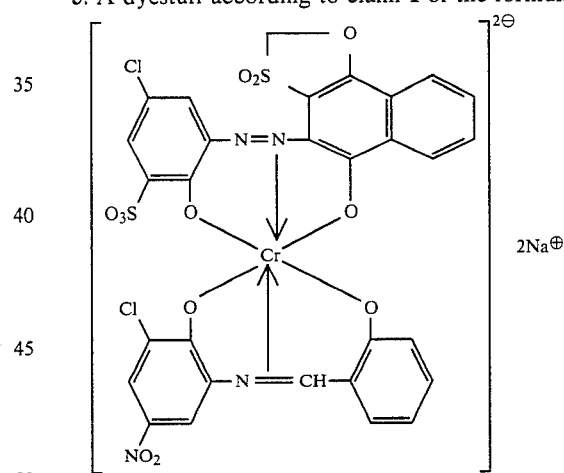

6. A dyestuff according to claim 1 of the formula

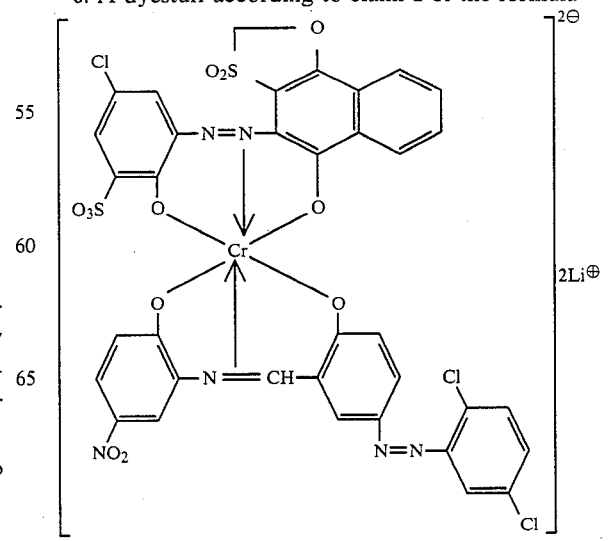

* * * * *

UNITED STATES PATENT AND TRADEMARK OFFICE
CERTIFICATE OF CORRECTION

PATENT NO. : 4,497,734
DATED : February 5, 1985
INVENTOR(S) : Winfried Mennicke

It is certified that error appears in the above-identified patent and that said Letters Patent is hereby corrected as shown below:

Col. 2, line 51      Insert space between "NO$_2$" and "or"
Col. 4, line 16      Delete "formula and substitute

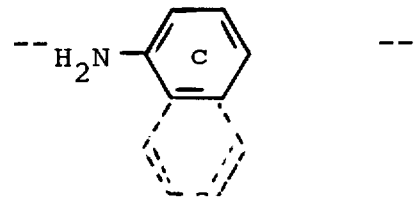

Col. 4, line 65      Correct spelling of "aminobenzoic" second instnace

Col. 5, line 22      After "paint" delete "of" and substitute --or--

Col. 8, line 1      Delete "47:1" and substitute --47.1--

Col. 17, line 35      Delete beginning of structure and substitute

Col. 17, line 53      Delete bottom of formula and substitute

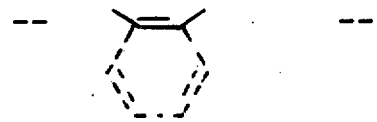

UNITED STATES PATENT AND TRADEMARK OFFICE
CERTIFICATE OF CORRECTION

PATENT NO. : 4,497,734

DATED : February 5, 1985

INVENTOR(S) : Winfried Mennicke

It is certified that error appears in the above-identified patent and that said Letters Patent is hereby corrected as shown below:

Col. 17, line 66                Insert space between "$CH_3$" and "or"

Col. 18, line 29                After "$NO_2$" insert --.--

Signed and Sealed this

Eighteenth Day of June 1985

[SEAL]

Attest:

DONALD J. QUIGG

Attesting Officer        Acting Commissioner of Patents and Trademarks